H. F. SCHUMANN.
PUMP PLUNGER.
APPLICATION FILED APR. 18, 1914.
1,168,118.
Patented Jan. 11, 1916.
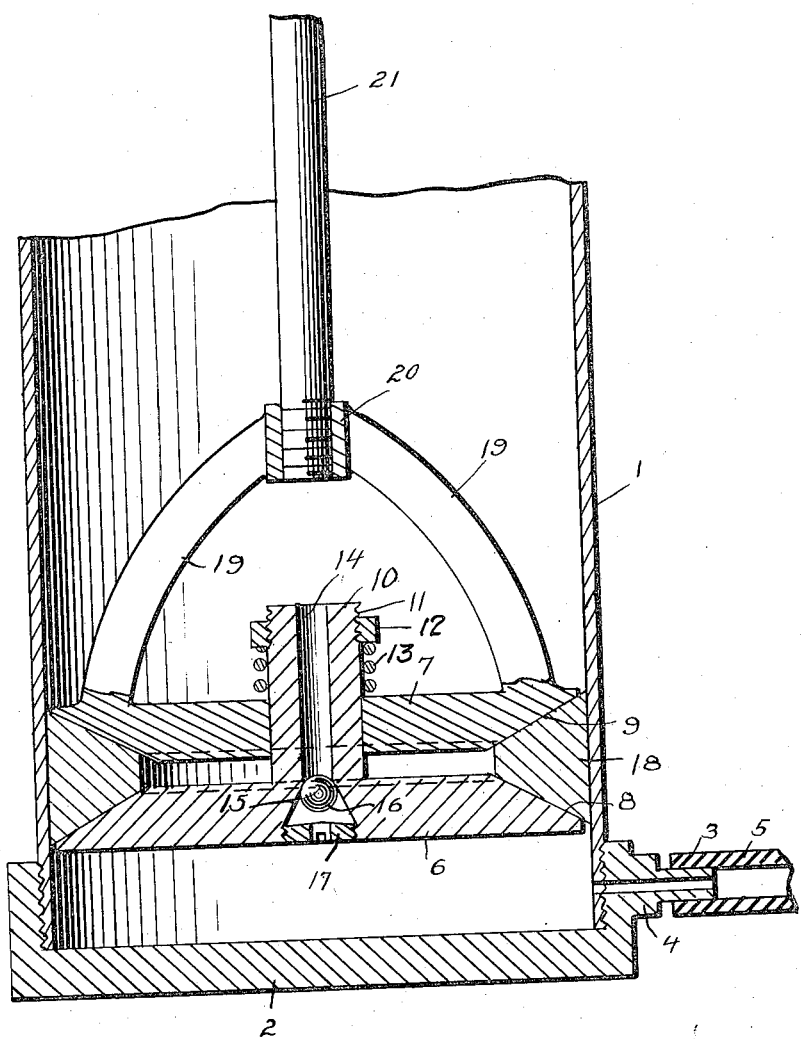
Inventor
H·F· Schumann

UNITED STATES PATENT OFFICE.

HARRY F. SCHUMANN, OF LOS GATOS, CALIFORNIA.

PUMP-PLUNGER.

1,168,118.

Specification of Letters Patent. Patented Jan. 11, 1916.

Application filed April 18, 1914. Serial No. 832,869.

*To all whom it may concern:*

Be it known that I, HARRY F. SCHUMANN, a citizen of the United States, residing at Los Gatos, in the county of Santa Clara and State of California, have invented certain new and useful Improvements in Pump-Plungers; and I do hereby declare the following to be a full, clear, and exact description of the invention, such as will enable others skilled in the art to which it appertains to make and use the same.

This invention relates to pump plungers, designed more particularly for use with air pumps, but capable of use on plungers generally and for piston heads for various uses, and one of the principal objects of the invention is to provide reliable and efficient means of simple construction for yieldingly pressing the packing of the piston head or pump plunger outward against the inner wall of the cylinder or suction pipe.

Another object of the invention is to provide a plunger head or piston comprising two members having oppositely beveled peripheral surfaces between which the packing is disposed, and said two members being yieldingly connected together so as to compensate for variations in the diameter of the interior walls of the cylinder and to force the packing outwardly, automatically and yieldingly.

These and other objects may be attained by means of the construction illustrated in the accompanying drawing, in which the figure is a vertical section taken through the cylinder and the plunger head.

Referring to the drawing, the numeral 1 designates a pump casing, which may be of any suitable size and construction, said casing being provided with a threaded cap or head 2. An air outlet nipple 3 is provided with a duct 4 which communicates with the interior of the casing 1 and may be provided with a suitable flexible tube 5 of the usual construction.

Fitted within the casing 1 is a plunger head or piston comprising the two members 6 and 7. The member 6 is provided with a beveled surface 8 near its periphery, and the member 7 is provided with an oppositely beveled surface 9 near its periphery. The member 6 is provided with a stud 10 extending through the member 7, and said stud 10 is exteriorly screw threaded as at 11 to receive an adjusting nut 12. A spiral spring 13 surrounds the stud 10 and is interposed between the nut 12 and the outer surface of the member 7. The stud 10 is provided with a bore or duct 14, which terminates in a flaring valve seat 15 for a ball valve 16. A threaded plug 17 is fitted in the member 6 and provided with a central aperture and valve seat.

It will be obvious that any suitable valve may be utilized instead of the ball valve 16. The packing 18 which may be of leather or other suitable yielding material is beveled upon its opposite side to conform to the bevels of the members 6 and 7. The spider arms 19 integrally connected to the member 7 are provided with a centrally disposed threaded boss 20 to receive the plunger rod 21.

From the foregoing it will be obvious that the packing 18 will be forced outwardly to form an air tight connection between said packing and the inner wall of the pump casing, owing to the construction of the beveled surfaces of the members 6 and 7 and the action of the spring 13 bearing upon the member 7 to force said members 6 and 7 together. It will also be apparent that the nut 12 may be adjusted to regulate the tension of the spring and to force the packing outward and to yield with the action of the plunger.

Various changes may be made in the details of construction without departing from the spirit and scope of the invention as defined in the claim.

What is claimed is:—

A piston head comprising a lower plate and an upper plate, a spider made integral with the upper plate, a sucker rod connected to said spider, said plates each having oppositely disposed annular beveled surfaces, a stud made integral with the lower plate and extending through said upper plate to approximately the center of the spider, said stud having a vertical bore, a valve in said bore, and an adjusting nut threaded on said stud, a spring encircling said stud and interposed between said adjusting nut and upper plate whereby the said gasket is forced outwardly.

In testimony whereof I affix my signature in presence of two witnssses.

HARRY F. SCHUMANN.

Witnessess:
HENRY SCHUMANN,
BELLE B. SCHUMANN.